US008737970B2

(12) United States Patent
Li et al.

(10) Patent No.: US 8,737,970 B2
(45) Date of Patent: May 27, 2014

(54) METHOD AND APPARATUS FOR PROCESSING RELEASE OF CONNECTION RESOURCES

(75) Inventors: Yunfei Li, Xi'an (CN); Zhaohui Zhang, Shenzen (CN); Bingbing Ma, Xi'an (CN); Bingyi Liu, Xi'an (CN); Guoyu Xu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 90 days.

(21) Appl. No.: 13/365,945

(22) Filed: Feb. 3, 2012

(65) Prior Publication Data

US 2012/0135768 A1 May 31, 2012

Related U.S. Application Data

(63) Continuation of application No. PCT/CN2010/071060, filed on Mar. 16, 2010.

(30) Foreign Application Priority Data

Aug. 6, 2009 (CN) .......................... 2009 1 0164192

(51) Int. Cl.
| | |
|---|---|
| *H04M 3/42* | (2006.01) |
| *H04W 76/06* | (2009.01) |
| *H04W 76/00* | (2009.01) |
| *H04W 76/02* | (2009.01) |
| *H04W 76/04* | (2009.01) |
| *H04W 74/00* | (2009.01) |

(52) U.S. Cl.
CPC .............. *H04W 76/06* (2013.01); *H04W 76/00* (2013.01); *H04W 76/02* (2013.01); *H04W 76/046* (2013.01); *H04W 76/04* (2013.01); *H04W 74/00* (2013.01)
USPC ........ 455/414.1; 455/436; 455/455; 455/509; 370/331; 370/328; 370/338

(58) Field of Classification Search
CPC ..... H04W 76/00; H04W 76/02; H04W 76/04; H04W 76/06; H04W 76/046; H04W 74/00

USPC .......... 455/436, 466, 445, 456.4, 432.3, 437, 455/422.1, 509, 424, 423, 414.1, 455; 370/335, 342, 329, 331, 328, 338; 380/270
See application file for complete search history.

(56) References Cited

U.S. PATENT DOCUMENTS 6,349,099 B1 * 2/2002 Larikka et al. ............. 370/395.1
(Continued)

FOREIGN PATENT DOCUMENTS

CN 1411286 A 4/2003
(Continued)

OTHER PUBLICATIONS

3GPPS A. S0018-0 v1.0, Interoperability Specification (IOS) for MSC Pool Network, 3rd Generation Partnership Project 2 "3GPP2", Dec. 2009, 30 pages.
English-language International Search Report from the Chinese Patent Office for International Application No. PCT/CN2010/071060 mailed Jul. 1 2010.

(Continued)

*Primary Examiner* — Mahendra Patel
(74) *Attorney, Agent, or Firm* — Conley Rose, P.C.; Grant Rodolph; Rayhao Chung (57) ABSTRACT

A method and an apparatus for processing release of connection resources are provided. The method includes: stopping transmitting a service message to a Mobile Switch Center (MSC) in a first preset duration after receiving a reset message transmitted by the MSC, and restoring transmission of the service message to the MSC after the first preset duration, where release of connection resources between a Base Station Controller (BSC) and the MSC is ensured to be completed in the first preset duration. Through the method and the apparatus for processing the release of the connection resources, after the MSC transmits the reset message, it is ensured that the services of other MSCs are not affected and also the connection corresponding to the MSC transmitting the reset message on the BSC is released, so new services are not affected accordingly, thereby improving Quality of Service (QoS) of the services.

16 Claims, 3 Drawing Sheets

(56) References Cited

U.S. PATENT DOCUMENTS

| | | | |
|---|---|---|---|
| 7,027,389 B2 | 4/2006 | Stewart | |
| 2002/0168984 A1* | 11/2002 | Wallentin | 455/452 |
| 2004/0082366 A1* | 4/2004 | Longoni et al. | 455/561 |
| 2004/0085893 A1 | 5/2004 | Wang et al. | |
| 2004/0156338 A1* | 8/2004 | Pasanen et al. | 370/331 |
| 2006/0209675 A1* | 9/2006 | Jacobson | 370/216 |
| 2006/0234706 A1* | 10/2006 | Wallentin | 455/436 |
| 2008/0089272 A1* | 4/2008 | Ahokangas | 370/328 |
| 2009/0042560 A1* | 2/2009 | Islam et al. | 455/423 |
| 2009/0129339 A1* | 5/2009 | Young et al. | 370/331 |

FOREIGN PATENT DOCUMENTS

| | | |
|---|---|---|
| CN | 1499780 A | 5/2004 |
| CN | 1741476 A | 3/2006 |
| CN | 1856148 A | 11/2006 |
| CN | 1859161 A | 11/2006 |
| CN | 101047601 A | 10/2007 |
| CN | 101141364 A | 3/2008 |
| CN | 101179815 A | 5/2008 |
| CN | 101640941 A1 | 2/2010 |
| JP | 2006254283 A | 9/2006 |
| KR | 100821173 B1 | 4/2008 |
| WO | WO 2011/015048 A1 | 2/2011 |

OTHER PUBLICATIONS

GSM: Global System for Mobile Communications, "$3_{rd}$ Generation Partnership Project; Technical Specification Group Services and System Aspects; Feasilbility Study on NAS Node Selection Function above BSC/RNC (Release 9)", 3GPP TR 23.823, V0.2.0, pp. 1-17, (Feb. 2009).

GSM: Global System for Mobile Communications, "$3_{rd}$ Generation Partnership Project; Technical Specification Group Services and System Aspects; Feasilbility Study on NAS Node Selection Function above BSC/RNC (Release 10)", 3GPP TR 23.823, V1.2.0, pp. 1-40, (Jan. 2010).

3GPP, "$3^{rd}$ Generation Partnership Project; Technical Specification Group Radio Access Network; UTRAN Iu interface Radio Access Network Application Part (RANAP) signalling (Release 8)", 3GPP TS 25.413, V8.3.0, pp. 1-398, (Jun. 2009).

Supplementary Extended European Search Report from the European Patent Office for EP 10 80 5952. dated Apr. 11, 2012.

Foreign Communication From a Counterpart Application, Chinese Application No. 201210004859.0, Chinese Office Action dated Jan. 6, 2014, 4 pages.

Foreign Communication From a Counterpart Application, Chinese Application No. 2012100048590, Chinese Search Report dated Dec. 19, 2013, 2 pages.

* cited by examiner

METHOD AND APPARATUS FOR PROCESSING RELEASE OF CONNECTION RESOURCES

CROSS-REFERENCE TO RELATED APPLICATIONS

This application is a continuation of International Application No. PCT/CN2010/071060, filed on Mar. 16, 2010, which claims priority to Chinese Patent Application No. 200910164192.9, filed on Aug. 6, 2009, both of which are hereby incorporated by reference in their entireties.

FIELD OF THE INVENTION

The present invention relates to the field of wireless communications technologies, and in particular, to a method and an apparatus for processing release of connection resources.

BACKGROUND OF THE INVENTION

In a conventional mobile network, a Base Station Controller (BSC) is only connected to one Mobile Switch Center (MSC), while the MSC may be connected to a plurality of BSCs. An interface between the MSC and the BSC is an A interface, and the protocol of the A interface is borne on the Signaling Connection Control Part (SCCP). Generally, when a user initiates a certain service, for example, a call, an SCCP connection between the MSC and the BSC may be established for the service. The establishment of the SCCP connection may be initiated by the BSC, or may also be initiated by the MSC. After the MSC Pool networking is introduced, the BSC may be connected to a plurality of MSCs through a Serving Node Selection Function (SNSF). Specifically, the BSC may be connected to different SNSFs through different links, and the SNSF presents a unique MSC identifier for the BSC, and therefore, the BSC is still merely connected to one MSC. A service request transmitted by the BSC is forwarded through the SNSF, and is distributed to different MSCs for processing. In this way, when a failure occurs on a certain MSC in the MSC Pool, the service may still be forwarded to other MSCs for processing, thereby improving the reliability of the network.

Before the MSC Pool networking, the MSC transmits a message to the BSC through a signaling point of the BSC, and then the BSC transmits the message to the MSC through a signaling point of the MSC. After the MSC Pool networking, the message transmitted between the MSC and the BSC is forwarded to the opposite end through the SNSF therebetween. In the service interaction between the BSC and the MSC, since the interaction message is lost, a phenomenon that the SCCP connection resource at one side is released while the SCCP connection resource at the other side is still occupied may occur. In order to avoid the deadlock of the single side connection resource, the following two solutions are provided in the SCCP.

One solution is as follows. In the MSC Pool networking, when a certain MSC crashes due to a failure, after the MSC is restarted as the failure is removed, since a service connection relation established on the MSC is lost, the MSC is required to transmit a global reset message to the BSC connected thereto. After the BSC receives the reset message, the BSC starts a timer, releases all the service connections established thereon, and transmits a Reset Acknowledge message to the MSC to indicate that the release of the connection resources is completed after the timer expires (the timer is disposed to ensure that all the related resources on the BSC are released). Before the BSC releases all the resources, in order to avoid abnormal SCCP connection between the MSC and the BSC, the BSC does not allow new services to be connected.

The other solution is as follows. The SCCP defines a connection check and release mechanism, that is, an Inactivity Test (IT) message is used to perform steady state detection. Specifically, after the failure of the MSC is removed, the MSC does not transmit the global reset message to the BSC, and all the corresponding original SCCP connections of the MSC on the BSC after the failure is removed need to be released through the IT detection.

In the implementation of the present invention, the inventor finds that the prior art at least has the following problems.

As for the first solution, in the MSC Pool networking, after the failure of a certain MSC is removed, the global reset message is transmitted to all the BSCs, and the BSCs release all the calls after receiving the global reset message. In this way, the services distributed to other normal MSCs are also abnormally released, that is, all the calls of the whole MSC Pool networking are abnormally released after the failure of the single MSC is removed.

As for the second solution, since the duration of the T(iar) timer of the SCCP connection is relatively long (the T(iar) timer is set at a local end, and the timer is restarted every time the message from the opposite end is received, and if the T(iar) timer expires, it is considered that the deadlock of the local connection resources occurs, and then the local connection resources are released), before the T(iar) timer of the SCCP connection at the BSC side expires, a connection reference number allocated by the MSC corresponding to the SCCP connection recorded on the BSC is released on the MSC. Therefore, when a new service is distributed to the MSC, the SCCP connection allocated by the MSC to the new service may still be not released on the BSC. In this way, the connection reference number newly allocated by the MSC practically exists in a mapping record of the BSC, and a phenomenon where two records on the BSC correspond to one connection reference number allocated by the MSC might occur. For example, a user A initiates a call, the connection reference number allocated on the MSC is "1"; after the failure of the MSC is removed, a user B initiates a call, and the MSC allocates the connection reference number "1" to the user B. The BSC transmits the subsequent service message of the user A to the MSC through a DT1 message, where the DT1 message merely includes a destination local reference number (allocated by the MSC), and the MSC may treat the service message of the user A as the service message of the user B for processing according to the destination local reference number in the DT1 message. When a large number of SCCP connections on the BSC are not released in the period of the MSC failure, after the failure is removed, the processing of the new services is conflicting and chaotic due to inconsistency of the connection states at two sides of the MSC and the BSC.

In conclusion, in the prior art, after the failure of the MSC in the MSC Pool networking is removed, and the reset message is transmitted, the normal services of other MSCs may be affected accordingly, and the new services may be affected due to the inconsistency of the connection states at the two sides of the MSC and the BSC, so the Quality of Service (QoS) of the services is lowered.

SUMMARY OF THE INVENTION

Accordingly, the present invention is directed to a method and an apparatus for processing release of connection resources, to solve a defect in the prior artwhere that normal services of other MSCs or new services are affected as a reset message is transmitted after a failure of an MSC in the MSC Pool networking is removed, so that the connection corresponding to the originally failed MSC on the BSC may be released, thereby ensuring the QoS of the services.

An embodiment of the present invention provides a method for processing release of connection resources, where the method includes:

stopping transmitting a service message to an MSC in a first preset duration after receiving a reset message transmitted by the MSC, and restoring transmission of the service message to the MSC after the first preset duration, where release of connection resources between a BSC and the MSC is ensured to be completed in the first preset duration.

An embodiment of the present invention provides a method for processing release of connection resources, where the method includes:

receiving a reset message forwarded by an MSC through an SNSF, where the reset message carries a Network Reference Identifier (NRI) of the MSC;

obtaining a destination service connection corresponding to the NRI carried in the reset message according to the NRI included in a connection reference number allocated by the MSC and the NRI carried in the reset message in an established service connection; and releasing connection resources occupied by the destination service connection.

An embodiment of the present invention provides a method for processing release of connection resources, where the method includes:

transmitting, by an MSC, a reset message, where the reset message carries an NRI of the MSC, so as to instruct a BSC to release connection resources occupied by a service connection corresponding to the NRI.

An embodiment of the present invention provides a method for processing release of connection resources, where the method includes:

after an MSC is restarted, in other connection reference number groups different from an original connection reference number group, allocating a connection reference number configured to establish a service connection to a service message transmitted by a BSC through an SNSF, where the original connection reference number group is a connection reference number group configured to allocate the connection reference number by the MSC before a failure.

An embodiment of the present invention provides a method for processing release of connection resources, where the method includes:

in a second preset duration after an MSC is restarted, allocating, by the MSC, in a second connection reference number group, a connection reference number configured to establish a service connection to a service message transmitted by a BSC through an SNSF, and switching to a first connection reference number group to allocate the connection reference number configured to establish the service connection to the service message transmitted by the BSC through the SNSF after the second preset duration, where release of connection resources between the BSC and the MSC is ensured to be completed in the second preset duration.

An embodiment of the present invention provides a method for processing release of connection resources, where the method includes:

recording a current third system time after detecting that failures occur in all links with a service processing entity, and setting an unavailability identifier indicating that the service processing entity is unable to receive a service message; and judging whether a time interval between the current system time and the third system time exceeds a first preset duration after detecting that the links with the service processing entity are restored; if the time interval exceeds the first preset duration, clearing the unavailability identifier and restoring transmission of the service message to the service processing entity, where connection resources related to the service processing entity and established before the failure are ensured to be successfully released in the first preset duration; and if the time interval does not exceed the first preset duration, further delaying a period, so that the time interval between the delayed system time and the third system time exceeds the first preset duration, clearing the unavailability identifier, and restoring transmission of the service message to the service processing entity.

An embodiment of the present invention provides an SNSF device, where the device includes:

a first receiving module, configured to receive a reset message transmitted by an MSC device;

a first transmission module, configured to transmit a service message to the MSC device; and a first control module, configured to control the first transmission module to stop transmitting the service message to the MSC device in a first preset duration after the first receiving module receives the reset message, and control the first transmission module to restore transmission of the service message to the MSC device after the first preset duration, where release of connection resources between a BSC and the MSC device is ensured to be completed in the first preset duration.

An embodiment of the present invention provides an SNSF device, where the device includes:

a first detection module, configured to record a current third system time after detecting that failures occur in all links with a service processing entity, and set an unavailability identifier indicating that the service processing entity is unable to receive a service message;

a second detection module, configured to judge whether a time interval between the current system time and the third system time exceeds a first preset duration after detecting that the links with the service processing entity are restored; and a third transmission module, configured to clear the unavailability identifier and restore the transmission of the service message to the service processing entity if the second detection module detects that the time interval between the current system time and the third system time exceeds the first preset duration, where connection resources related to the service processing entity and established before the failure are ensured to be successfully released in the first preset duration, and if the second detection module detects that the time interval between the current system time and the third system time does not exceed the first preset duration, delay a period, so that the time interval between the delayed system time and the third system time exceeds the first preset duration, clear the unavailability identifier, and restore the transmission of the service message to the service processing entity.

An embodiment of the present invention provides a BSC, where the BSC includes:

a second receiving module, configured to receive a reset message forwarded by an MSC device through an SNSF, where the reset message carries an NRI of the MSC device;

an obtaining module, configured to obtain a destination service connection corresponding to the NRI carried in the reset message in an established service connection according to the NRI included in a connection reference number allocated by the MSC device and the NRI carried in the reset message; and a release processing module, configured to release connection resources occupied by the destination service connection obtained by the obtaining module.

An embodiment of the present invention provides an MSC device, where the device includes:

a second construction module, configured to construct a reset message, where the reset message carries an NRI of the MSC device; and a second transmission module, configured to transmit the reset message, so as to instruct a BSC to release connection resources occupied by a service connection corresponding to the NRI.

An embodiment of the present invention provides an MSC device, where the device includes:

a first allocation module, configured to allocate a connection reference number configured to establish a service connection to a service message transmitted by a BSC through an SNSF; and a second control module, configured to, after the MSC device is restarted, control the first allocation module to allocate the connection reference number in other connection reference number groups different from an original connection reference number group, where the original connection reference number group is a connection reference number group configured to allocate the connection reference number by the MSC device before a failure.

An embodiment of the present invention provides an MSC device, where the device includes:

a second allocation module, configured to allocate a connection reference number configured to establish a service connection to a service message transmitted by a BSC through an SNSF; and a third control module, configured to, in a second preset duration after an MSC device is restarted, control the second allocation module to allocate, in a second connection reference number group, the connection reference number configured to establish a service connection to the service message transmitted by the BSC through the SNSF, and switch to a first connection reference number group to allocate the connection reference number configured to establish the service connection to the service message transmitted by the BSC through the SNSF after the second preset duration, where release of connection resources between the BSC and the MSC device is ensured to be completed in the second preset duration.

Through the method and the apparatus for processing the release of the connection resources provided in the embodiments of the present invention, after the MSC transmits the reset message, it is ensured that the services of other MSCs are not affected and the connection corresponding to the MSC transmitting the reset message originally on the BSC is released, so new services are not affected, thereby improving the QoS of the services.

BRIEF DESCRIPTION OF THE DRAWINGS

To illustrate the technical solutions according to the embodiments of the present invention or in the prior art more clearly, the accompanying drawings for describing the embodiments or the prior art are introduced briefly in the following. Apparently, the accompanying drawings in the following description are only some embodiments of the present invention, and persons of ordinary skill in the art can derive other drawings from the accompanying drawings without creative efforts.

DETAILED DESCRIPTION OF THE EMBODIMENTS

In order to make the objectives, technical solutions, and advantages of the present invention more comprehensible, the technical solutions in the embodiments of the present invention are described in further detail below with reference to the accompanying drawings. It is obvious that the embodiments to be described are only a part rather than all of the embodiments of the present invention. All other embodiments obtained by persons of ordinary skill in the art based on the embodiments of the present invention without creative efforts shall fall within the protection scope of the present invention.

In MSC Pool networking, after a failure of an MSC is removed, corresponding processing after the failure is removed in the prior art may affect normal services of other MSCs, or the inconsistency of connection states at two sides of the MSC and a BSC may affect new services. As for the foregoing defects in the prior art, the embodiments of the present invention provide the following solutions, so that after the MSC in the MSC Pool networking transmits a reset message due to reasons such as the removal of the failure, it is ensured that the services of other MSCs are not affected and the connection corresponding to the originally failed MSC on the BSC can be released, so new services are not affected.

Figure 1:
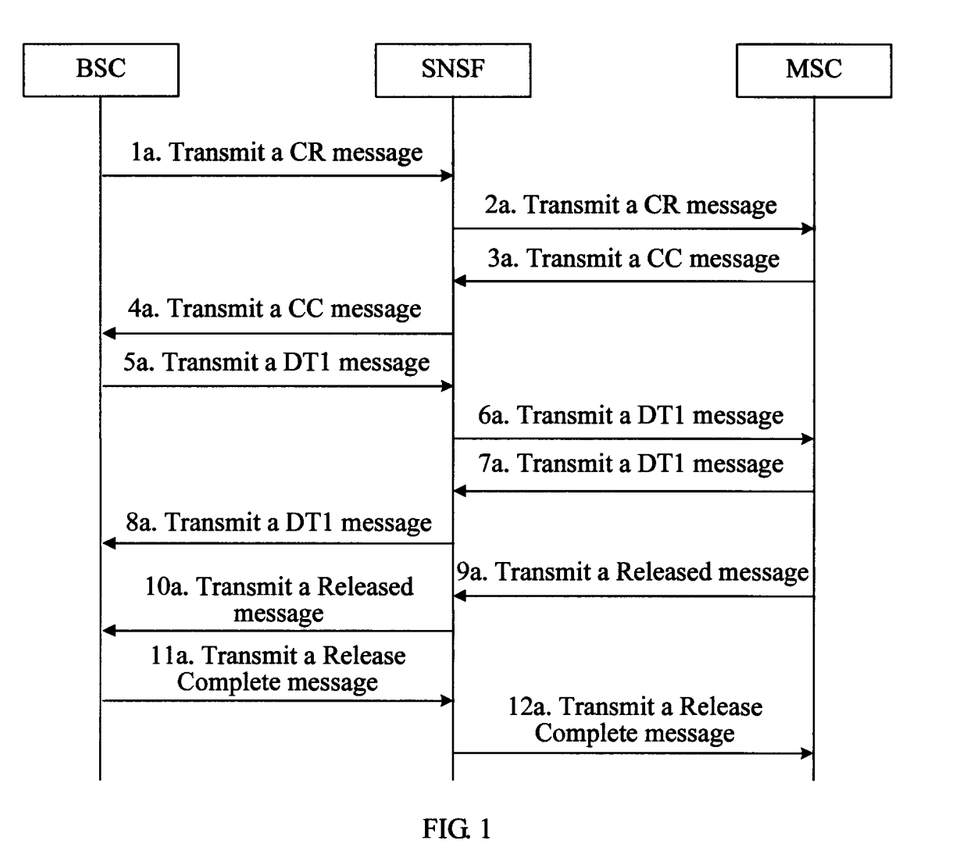
FIG. 1 is a schematic diagram of a signaling flow of establishing a SCCP connection in MSC Pool networking according to an embodiment of the present invention.

FIG. 1 is a schematic diagram of a signaling flow of establishing a SCCP connection in MSC Pool networking according to an embodiment of the present invention, and as shown in FIG. 1, the flow includes the following steps.

Step 1a, a BSC allocates a connection reference number of a local side, transmits a Connection Request (CR) message of the SCCP to an SNSF, where the CR message carries a source local reference number (a value thereof is the connection reference number allocated by the BSC).

A source signaling point in the CR message is a signaling point of the BSC, and a destination signaling point in the CR message is a signaling point of the SNSF (the signaling point of the SNSF is a unified signaling point presented by a core network for the BSC).

Step 2a, the SNSF receives the CR message from the BSC, determines to which MSC the CR message should be forwarded according to a certain principle, for example, a user identifier, replaces the destination signaling point in the message with the determined signaling point of the MSC, and forwards the message to the corresponding MSC, where the source signaling point in the CR message is still the signaling point of the BSC, and the destination signaling point is replaced by the determined signaling point of the MSC.

Step 3a, the MSC receives the CR message from the BSC, allocates the connection reference number of the local side, records the connection reference number of an opposite end BSC, and establishes a corresponding relation between the connection reference number of the local side and the connection reference number of the opposite end.

The connection reference number allocated by the MSC carries an NRI, and the NRI may uniquely identify the MSC in the MSC Pool networking. For example, the connection reference number is a value with 3 bytes, where a part of the information is the NRI, for example, it is specified that the previous 4 bits is the NRI.

The MSC transmits a Connection Confirm (CC) message, where the CC message carries a source local reference number (a value thereof is the connection reference number allocated by the MSC) and a destination local reference number (a value thereof is the connection reference number allocated by the BSC). The source signaling point in the CC message is the signaling point of the MSC, and the destination signaling point is the signaling point of the BSC. The CC message is transmitted to the SNSF through a link.

Step 4a, the SNSF receives the CC message, replaces the source signaling point in the CC message, which is originally the signaling point of the MSC, with the signaling point of the SNSF, where the destination signaling point in the CC message is still the signaling point of the BSC, and forwards the CC message to the BSC.

The BSC receives the CC message, records the connection reference number of the opposite end MSC, and establishes the corresponding relation between the connection reference number of the local side and the connection reference number of the opposite end.

Step 5a, when the BSC transmits a current service message to the MSC, the service message is delivered through a DT1 message of the SCCP. The BSC transmits the DT1 message to the MSC, where the DT1 message carries the destination local reference number (that is, the connection reference number allocated by the MSC side). The source signaling point in the DT1 message is the signaling point of the BSC, and the destination signaling point in the DT1 message is the signaling point of the SNSF.

Step -i a, the SNSF receives the DT1 message from the BSC, determines to which MSC the DT1 message should be forwarded according to the NRI information in the destination local reference number in the DT1 message, replaces the destination signaling point in the message with the corresponding signaling point of the MSC, and forwards the DT1 message to the corresponding MSC, where the source signaling point in the DT1 message is still the signaling point of the BSC, and the destination signaling point is replaced by the determined signaling point of the MSC.

The MSC receives the DT1 message from the BSC, and finds the corresponding SCCP connection according to the destination local reference number in the DT1 message for corresponding service processing.

Step 7a, when the MSC transmits the current service message to the BSC, the service message is delivered through the DT1 message of the SCCP. The MSC transmits the DT1 message, where the DT1 message carries the destination local reference number (that is, the connection reference number allocated by the BSC side). The source signaling point in the DT1 message is the signaling point of the MSC, and the destination signaling point is the signaling point of the BSC. The DT1 message is transmitted to the SNSF through a link.

Step 8a, the SNSF replaces the source signaling point in the DT1 message, which is originally the signaling point of the MSC, with the signaling point of the SNSF, where the destination signaling point in the DT1 message is still the signaling point of the BSC, and forwards the DT1 message to the BSC.

The BSC receives the DT1 message from the MSC, and finds the corresponding SCCP connection according to the destination local reference number in the DT1 message for corresponding service processing.

Step 9a, when the current service processing is over, the corresponding SCCP connection needs to be removed. The MSC transmits a Released message of the SCCP to the BSC, where the Released message carries a source local reference number (a value thereof is the connection reference number allocated by the MSC) and a destination local reference number (a value thereof is the connection reference number allocated by the BSC). The source signaling point in the Released message is the signaling point of the MSC, and the destination signaling point is the signaling point of the BSC. The Released message is transmitted to the SNSF through a link.

Step 10a, the SNSF replaces the source signaling point in the Released message, which is originally the signaling point of the MSC, with the signaling point of the SNSF, where the destination signaling point in the Released message is still the signaling point of the BSC, and forwards the Released message to the BSC.

Step 11a, the BSC receives the Released message from the MSC, transmits a Release Complete message of the SCCP to the MSC, and releases the related SCCP connection resources. The BSC transmits the Release Complete message to the MSC, where the Release Complete message carries a source local reference number (a value thereof is the connection reference number allocated by the BSC) and a destination local reference number (a value thereof is the connection reference number allocated by the MSC). The source signaling point in the Release Complete message is the signaling point of the BSC, and the destination signaling point in the Release Complete message is the signaling point of the SNSF.

Step 12a, the SNSF receives the Release Complete message from the BSC, determines to which MSC the Release Complete message should be forwarded according to the NRI information in the destination local reference number in the Release Complete message, replaces the destination signaling point in the Release Complete message with the corresponding signaling point of the MSC, and forwards the Release Complete message to the corresponding MSC, where the source signaling point in the Release Complete message is still the signaling point of the BSC, and the destination signaling point is replaced by the determined signaling point of the MSC.

During service interaction, since an interaction message is lost, the SCCP connection resources at one side are released, while the SCCP connection resources at the other side are still occupied. In order to avoid such deadlock of single-side connection resources, the SCCP defines a connection check and release mechanism and uses an IT message to perform stability detection. The steps are specifically as follows.

After the SCCP connection is established, two timers are started on a local end (including the MSC and the BSC) for the connection, which are respectively as follows: a receiving timer T(iar), that is, "the receive inactivity control timer" and a sending timer T(ias), that is, "the send inactivity control timer".

The T(ias) timer is restarted each time a message is transmitted to the opposite end, and if the T(ias) timer expires, the IT message is transmitted to the opposite end.

The T(iar) timer is restarted each time the message is received from the opposite end, and if the T(iar) timer expires, it is considered that the deadlock of the local connection resources occurs, and then the local connection resources are released.

It should be noted that, in order to prevent the connection resources from being removed by mistake since the message is lost, the duration of the T(iar) timer needs to be longer than the duration of the T(ias) timer, and generally two times longer.

On the basis of the SCCP connection establishment flow in the MSC Pool networking and the stability detection release mechanism, the embodiments of the present invention provide the following solutions described in detail. It should be noted that, in the following embodiments, many reasons for initiating the MSC to transmit a reset message exist, for example, the reset message is transmitted after the MSC is restarted when the failure is removed; the reset message is transmitted in a restart flow initiated by maintenance personnel due to version upgrades; or the MSC is triggered to transmit the reset message as the maintenance personnel directly inputs commands at a maintenance console. For simplicity, in the embodiments provided in various solutions of the present invention, the reset message is transmitted after the MSC is restarted when the failure is removed, which is not limited thereto.

One solution provided in the embodiment of the present invention is as follows. After a certain MSC in the MSC Pool networking is restarted when the failure is removed, the MSC still transmits the reset message to the BSC. After the SNSF between the MSC and the BSC receives the reset message transmitted by the restarted MSC when the failure is removed to the BSC, the SNSF stops transmitting the service message to the MSC in the first preset duration, and restores transmission of the service message to the MSC after the first preset duration, where the release of the connection resources between the BSC and the MSC is ensured to be completed in the first preset duration. It can be known from the above that, the difference between this embodiment and the prior art lies in that, after the SNSF receives the reset message transmitted by the MSC, the SNSF does not forward the reset message to the BSC, but instead, captures the reset message instead of transmitting the reset message to the BSC, and returns a Reset Acknowledge message to the MSC in replacement of the BSC.

The SNSF learns that the MSC is restarted when the failure is removed according to the reset message, and it is considered that the MSC is in an abnormal state in the first preset duration according to the presetting, so that the SNSF does not forward any new service message to the MSC in the first preset duration. After the specified first preset duration, it is considered that the MSC is restored to a normal state, and new service messages may be distributed to the MSC again. In this embodiment, the key point is to determine the length of the first preset duration, the release of the connection resources between the BSC and the MSC is ensured to be completed in the first preset duration, that is, the original SCCP connection corresponding to the MSC on the BSC is ensured to be released through the IT mechanism, and generally, the first preset duration is longer than or equal to T(iar). In this way, through this embodiment, it is avoided that the reset message is transmitted to all the BSCs causing that all the service connections including the normal service connections are released accordingly. Moreover, since no new service is distributed to the MSC in the duration not shorter than T(iar), it is avoided that two records correspond to one connection reference number allocated by the MSC on the BSC, thereby improving the QoS of the services.

In this embodiment, as for the application of a service distribution structure, one state (a transition state) of the service processing entity, for example, the MSC is added at a service distribution node, for example, the SNSF, where the transition state is a state of the MSC after restart and is a transition stage from the restart to the normal state of the MSC, and in such a state, the SNSF does not distribute new services to the MSC. The SNSF detects that the MSC enters the transition state after the MSC becomes normal as the failure is removed, sets the MSC to the normal state after a preset period, and forwards the new service messages to the MSC after the MSC enters the normal state.

The length of the transition state may be flexibly processed by the SNSF, for example, after it is detected that the link with the MSC is restored, the SNSF considers that the MSC is restored after a period of time. The period of time may be controlled by starting a timer, or by reading the system time at a specific event and comparing the time that has passed.

The transition period of time may be adjusted according to the failure time of the MSC. For example, if the failure of the MSC lasts for a long time the transition time is set to be short, and the related connection resources on the BSC are ensured to be released. Alternatively, if the failure of the MSC lasts for a long time, the transition time is set to be long, and in such a case, the failure of the MSC is probably severe and the MSC needs a certain buffer time.

Therefore, the failure duration may start from complete break of the link to the detection that a first link is restored.

Figure 2:
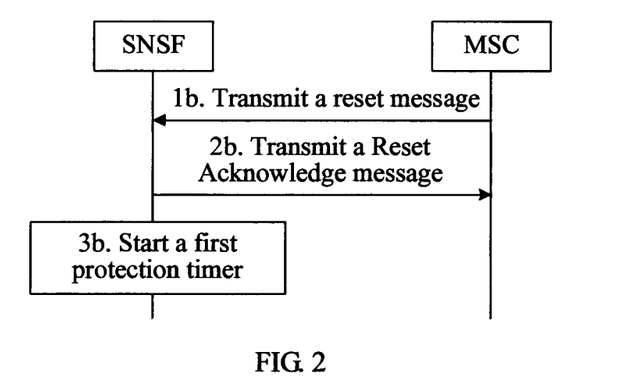
FIG. 2 is a signaling diagram of Embodiment 1 of a method for processing release of connection resources according to the present invention.

FIG. 2 is a signaling diagram of Embodiment 1 of a method for processing release of connection resources according to the present invention. As shown in FIG. 2, the processing method where an SNSF intercepts a reset message includes the following steps.

In step 1*b*, after an MSC is restarted, the MSC transmits a reset message to an SNSF to request the SNSF to forward the message to a BSC, so that the BSC releases a previously established SCCP connection.

The restart of the MSC may be implemented after a failure is removed, or directly triggered by the operating personnel. In this embodiment, when the MSC is connected to a plurality of SNSFs, the MSC may transmit the reset message to all the SNSFs after the MSC is restarted when the failure is removed; or the MSC may transmit the reset message to one of the SNSFs, and then the SNSF transmits a notification message to other SNSFs to inform the restart of the MSC.

In step 2*b*, after the SNSF receives the reset message from the MSC, the SNSF does not forward the message to the BSC, but constructs a Reset Acknowledge message itself and returns the Reset Acknowledge message to the MSC.

In step 3*b*, the SNSF starts a first protection timer for the MSC, and sets a first preset duration on the first protection timer, to control the transmission of the service message. The step is specifically as follows: before the first protection timer expires, the SNSF records that the MSC is in an abnormal state and does not distribute new service messages to the MSC; and when the first protection timer expires, the SNSF records that the MSC is restored and distributes new service messages to the MSC.

It should be noted that, steps 2b and 3b in the foregoing embodiment are not required to be performed in a certain order.

The foregoing embodiment may be implemented without setting the protection timer, and the steps thereof are specifically as follows. After the SNSF receives the reset message transmitted to the BSC by the restarted MSC, the SNSF records a current first system time and sets an unavailability identifier indicating that the MSC is unable to receive the service message, that is, the MSC is in a transition state. After the SNSF receives a connection establishment request message transmitted by the BSC, the SNSF judges that the unavailability identifier is correspondingly set for the MSC and judges whether a time interval between the first system time and the current system time exceeds the first preset duration, and if the duration exceeds the first preset duration, the SNSF clears the unavailability identifier, that is, the MSC is in the normal state, and restores transmission of the service message to the MSC.

The foregoing embodiment further includes the following steps. When the SNSF detects that the failures occur in all the links with the MSC, the SNSF records a current second system time and sets the unavailability identifier indicating that the MSC is unable to receive the service message. After the SNSF receives the reset message transmitted by the MSC, the SNSF judges whether a time interval between the second system time and the current system time exceeds the first preset duration, and if the duration exceeds the first preset duration, the SNSF clears the unavailability identifier, that is, the MSC is in the normal state, and restores transmission of the service message to the MSC. Alternatively, if a first time interval between the current system time and the second system time does not exceed the resource release time required to complete the release of the connection resources between the BSC and the MSC, the first preset duration is adjusted to a difference value between the resource release time and the first time interval, and the unavailability identifier is cleared after the first preset duration. That is to say, the duration of the transition state of the MSC is adjusted, so that the related connection resources on the BSC may be ensured to be released in the total duration of the MSC failure duration plus the MSC transition duration.

It should be noted that, in the foregoing embodiment, a case that an MSC is newly added in the MSC Pool networking is further included. The newly added MSC transmits a reset message when the MSC is started for the first time. In such a case, the SNSF is not required to restrict forwarding of the services. To handle this case, the first preset duration on the SNSF may be manually adjusted. That is, in the case of the newly added MSC, the first preset duration on the SNSF may be manually modified in advance, for example, the first preset duration may be modified to "0". Definitely, since each BSC completes the resource release in the different duration, the first preset duration involved in the foregoing embodiments may also be adjustable.

In the method for processing the release of the connection resources provided in the embodiment of the present invention, the SNSF is improved, so that the SNSF does not forward the reset message received from the MSC to the BSC, but controls the time of distributing new services to the MSC according to the first preset duration. Therefore, after the MSC is restarted, it is ensured that the services of other MSCs are not affected and the connection corresponding to the originally failed MSC on the BSC can be released, so new services are not affected, thereby improving the QoS of the services.

Another solution provided in the embodiment of the present invention is that, after an MSC in the MSC Pool networking is restarted, a reset message transmitted to the BSC by the MSC is modified, and specifically, an MSC identifier, that is, NRI information, configured to uniquely identify the MSC in the MSC Pool networking is added in the reset message, so as to instruct the BSC to release the connection resources occupied by the service connection corresponding to the NRI information. The BSC receives the reset message forwarded by the SNSF, obtains the destination service connection corresponding to the NRI information carried in the reset message in the established service connection according to the NRI information included in the connection reference number allocated by the MSC and the NRI information carried in the reset message, and then releases the connection resources occupied by the destination service connection.

Figure 3:
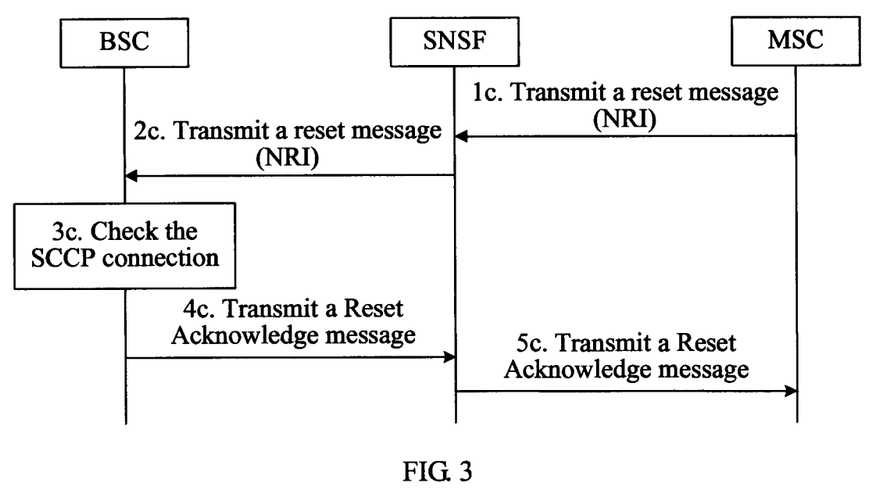
FIG. 3 is a signaling diagram of Embodiment 2 of a method for processing release of connection resources according to the present invention.

FIG. 3 is a signaling diagram of Embodiment 2 of a method for processing release of connection resources according to the present invention. As shown in FIG. 3, the processing method of adding NRI information in a reset message includes the following steps.

In step 1c, after an MSC is restarted, the MSC transmits a reset message to an SNSF to request the SNSF to forward the message to a BSC, so that the BSC releases a previously established SCCP connection, where the reset message carries the NRI information.

The restart of the MSC may be implemented after a failure is removed, or directly triggered by the operating personnel.

In step 2c, the SNSF forwards the reset message to the BSC.

In step 3c, the BSC checks the established SCCP connection. If the NRI information in a connection reference number of an opposite end recorded in the SCCP connection is the same as the NRI information in the reset message, the BSC releases the corresponding SCCP connection; and if the NRI information in the connection reference number of the opposite end recorded in the SCCP connection is different from the NRI information in the reset message, the corresponding SCCP connection is not affected.

In step 4c, the BSC transmits a Reset Acknowledge message to the SNSF.

In step 5c, the SNSF forwards the Reset Acknowledge message to the MSC.

Optionally, if the BSC is directly connected to a plurality of MSCs without the SNSF, the reset message transmitted by the MSC is directly transmitted to the BSC, and the BSC returns the Reset Acknowledge message to the MSC after receiving the reset message.

In the method for processing the release of the connection resources provided in the embodiment of the present invention, the MSC adds the NRI information in the reset message, so that the BSC receives the reset message transmitted by the MSC, finds the SCCP connection requiring resource release according to the NRI information in the reset message, and releases the occupied resources. Therefore, it is ensured that the services of other MSCs are not affected and the connection corresponding to the originally failed MSC on the BSC can be released, so new services are not affected, thereby improving the QoS of the services.

Still another solution provided in the embodiment of the present invention is as follows. After an MSC in the MSC Pool networking is restarted, the MSC does not transmit a reset message to the BSC, divides the SCCP connection reference number resources, and adopts different allocation policies according to actual requirements, so as to avoid the conflict between the newly allocated connection reference number resources and the connection reference number resources allocated before the failure. One implementation manner thereof is that, after the MSC is restarted, in other connection reference number groups different from the original connection reference number group, the connection reference number configured to establish the service connection is allocated to the service messages transmitted by the BSC through the SNSF, where the original connection reference number group is a connection reference number group configured to allocate the connection reference number by the MSC before the failure. Specifically, the MSC divides all the allocatable connection reference number resources into a plurality of connection reference number groups, and after each restart, the MSC switches the connection reference number groups, that is, the connection reference number is allocated to the SCCP service connection in a new connection reference number group, so as to avoid that the allocated connection reference number overlaps the connection reference number allocated in the connection reference number groups before the failure. Further, the connection reference number groups may be divided according to the NRI information included in the connection reference number. Specifically, one MSC corresponds to two or more NRI identifiers, and after each restart, the MSC switches to an effective NRI identifier.

In this embodiment, another implementation manner of the solution is further provided, where, the SCCP connection reference number resources are divided on the basis of the MSC, and different allocation policies are adopted according to actual requirements, so as to avoid the conflict between the newly allocated connection reference number resources and the connection reference number resources allocated before the failure. In a second preset duration after the MSC is restarted, the MSC allocates the connection reference number configured to establish the service connection to the service message transmitted by the BSC through the SNSF in a second connection reference number group, and switches to the first connection reference number group after the second preset duration to allocate the connection reference number configured to establish the service connection to the service message transmitted by the BSC through the SNSF, where the release of the connection resources between the BSC and the MSC is ensured to be completed in the second preset duration.

Specifically, the MSC divides all the allocatable connection reference number resources into a plurality of connection reference number groups, for example, two connection reference number groups are divided in this embodiment, and the two connection reference number groups are respectively a first connection reference number group and a second connection reference number group. In order to avoid that the MSC repeatedly allocates the originally allocated connection reference number to other services during a connection resource release procedure through an IT mechanism by the BSC, the MSC allocates the connection reference number to the service connection in two different connection reference number groups in different periods of time in this embodiment. The second preset duration, that is, the switch duration, should be longer than or equal to T(iar). In a period not shorter than T(iar), the MSC allocates the connection reference number in the second connection reference number group, and in a period over T(iar), the MSC allocates the connection reference number in the first connection reference number group.

Definitely, the MSC may also divide the connection reference number resources into a plurality of connection reference number groups, and selects according to a certain switch principle, so as to ensure that the connection reference number allocated in the T(iar) period is different from the previously allocated connection reference number. For example, the second connection reference number group is a connection reference number with a final digit being 0, while the first connection reference number group is a connection reference number with a final digit being not 0.

Further, the connection reference number groups may be divided according to the NRI information included in the connection reference number. The specific step thereof may be as follows: one MSC corresponds to two or more NRI identifiers, and the MSC switches to an effective NRI identifier according to the set second preset duration.

In the foregoing embodiment, the second preset duration may be controlled by a second protection timer on the MSC, the second preset duration is set on the second protection timer, and the second protection timer is started to control the selection of different connection reference number groups after the MSC is restarted. Alternatively, the timer is not started, the system time when the MSC is restarted is recorded to judge the time that has passed from the restart time, and different signs are set to determine which group of the connection reference resources is allocated.

In the method for processing the release of the connection resources provided in this embodiment, the MSC does not transmit the reset message to the BSC after restart, divides the SCCP connection reference number resources, and adopts different allocation policies according to actual requirements, so as to avoid the conflict between the newly allocated connection reference number resources and the connection reference number resources allocated before the failure. Therefore, it is ensured that the services of other MSCs are not affected and the connection corresponding to the originally failed MSC on the BSC can be released, so new services are not affected, thereby improving the QoS of the services.

Still another solution provided in the embodiment of the present invention is as follows. The SNSF judges which state the MSC is in by detecting a service processing entity, for example, the MSC. The SNSF records states of the MSCs, which may be divided into a normal state, a failure state, and a transition state. When the SNSF detects that all the links with the specific MSC break, the MSC is marked to be in the failure state. After the SNSF detects that the first link with the specific MSC is restored, the MSC is marked to be in the transition state. The SNSF marks the MSC in the transition state to be in the normal state after a period of time. The duration when the specific MSC is in the transition state may be adjusted according to actual requirements. For example, if the failure of the MSC lasts for a short time, the transition duration is set to be long, and the related connection resources on the BSC are ensured to be released. After receiving a service request from the BSC, the SNSF forwards the service request to the MSC in the normal state for processing. Specifically, after detecting that failures occur in all the links with the MSC, the SNSF sets the unavailability identifier indicating that the MSC is unable to receive the service message to record that the MSC is in the failure state, and record the failure start time of the MSC as a current third system time. Subsequently, after detecting that the first link with the MSC is restored, the SNSF records that the MSC is in the transition state and records the failure end time of the MSC as the current system time, and the failure duration of the MSC is obtained by subtracting the failure start time from the failure end time. The transition stage duration is set according to the failure duration. The SNSF checks the MSC has passed the transition stage duration, clears the unavailability identifier, and records that the MSC is in the normal state. The SNSF may control the transition state of the MSC by starting the timer, for example, after the SNSF detects that the first link with the MSC is restored, the SNSF records that the MSC is in the transition state, starts the timer, where the duration of the timer is the transition stage duration, and sets the MSC to be in the normal state after the timer expires. The SNSF may also control the transition state of the MSC by reading the system time when a specific event starts, for example, after detecting that the first link with the MSC is restored, the SNSF records that the MSC is in the transition state and records the start time of the transition state as the current system time, and when the service request message from the BSC is received, the SNSF subtracts the start time of the transition state from the current system time for the MSC in the transition state, and if the value thereof exceeds the transition stage duration, the MSC is recorded to be in the normal state. The failure stage duration and the transition stage duration are added to obtain the total failure-transition stage duration, the total failure-transition stage duration should be longer than or equal to the first preset duration, and the connection established on the BSC before the failure is ensured to be released through the IT mechanism in the first preset duration. In this way, in the method, the MSC is not required to transmit the reset message, nor perform special processing of allocating the connection reference number, so that the conflict between the newly allocated connection reference number resources and the allocated connection reference number resources before the failure is avoided. Therefore, it is ensured that the services of other MSCs are not affected and the connection corresponding to the originally failed MSC on the BSC can be released, so new services are not affected, thereby improving the QoS of the services.

In the method for processing the release of the connection resources provided in the foregoing embodiments, if a Signaling Connection Control Part User Adaptation Layer (SUA) is used to replace the SCCP, the foregoing solution is still effective, where the SUA may be referred to as the SCCP adaptation layer protocol for short. The SUA protocol belongs to the Signaling Transport (SIGTRAN) protocol suite. The foregoing embodiments are not limited to the MSC Pool distribution, and may be used in any system configured with service distribution.

Persons of ordinary skill in the art should understand that all or a part of the steps of the method according to the embodiments of the present invention may be implemented by a program instructing relevant hardware. The program may be stored in a computer readable storage medium. When the program is run, the steps of the method according to the embodiments of the present invention are performed. The storage medium may be any medium that is capable of storing program codes, such as a ROM, a RAM, a magnetic disk, or an optical disk.

Figure 4:
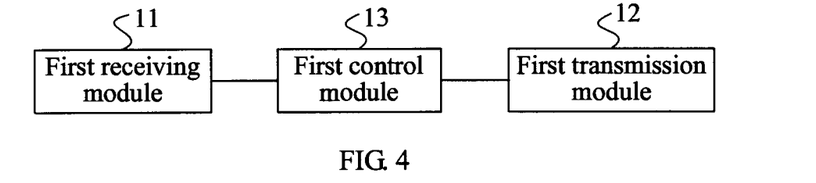
FIG. 4 is a schematic structure diagram of Embodiment 1 of an SNSF according to the present invention.

FIG. 4 is a schematic structure diagram of Embodiment 1 of an SNSF according to the present invention. As shown in FIG. 4, the SNSF includes a first receiving module 11, a first transmission module 12, and a first control module 13. The first receiving module 11 is configured to receive a reset message transmitted by an MSC. The first transmission module 12 is configured to transmit a service message to the MSC. The first control module 13 is configured to control the first transmission module 12 to stop transmitting the service message to the MSC in a first preset duration after the first receiving module 11 receives the reset message, and control the first transmission module 12 to restore the transmission of the service message to the MSC after the first preset duration, where release of connection resources between a BSC and the MSC is ensured to be completed in the first preset duration.

Specifically, after an MSC in MSC Pool networking is restarted due to removal of a failure or an active operation of an operator, the MSC still transmits the reset message to the BSC. After the first receiving module 11 in the SNSF receives the reset message transmitted by the restarted MSC to the BSC, the first control module 13 starts a timer, it is considered that the MSC is in an abnormal state in the first preset duration, and the first control module 13 controls the first transmission module 12 not to forward any new service messages to the MSC. After the specified first preset duration is passed for the timer, it is considered that the MSC is restored to a normal state, and the first control module 13 controls the first transmission module 12 to distribute new service messages to the MSC. The release of the connection resources between the BSC and the MSC is ensured to be completed in the first preset duration, that is, the original SCCP connection corresponding to the MSC on the BSC can be released through an IT mechanism, and generally, the first preset duration is longer than or equal to T(iar).

Through the SNSF in this embodiment, it is avoided that the reset message is transmitted to all the BSCs causing that all the service connections including the normal service connection are released accordingly. Moreover, since new services are not distributed to the MSC in the duration not shorter than T(iar), it is avoided that two records correspond to one connection reference number allocated by the MSC on the BSC, thereby improving the QoS of the services.

Figure 5:
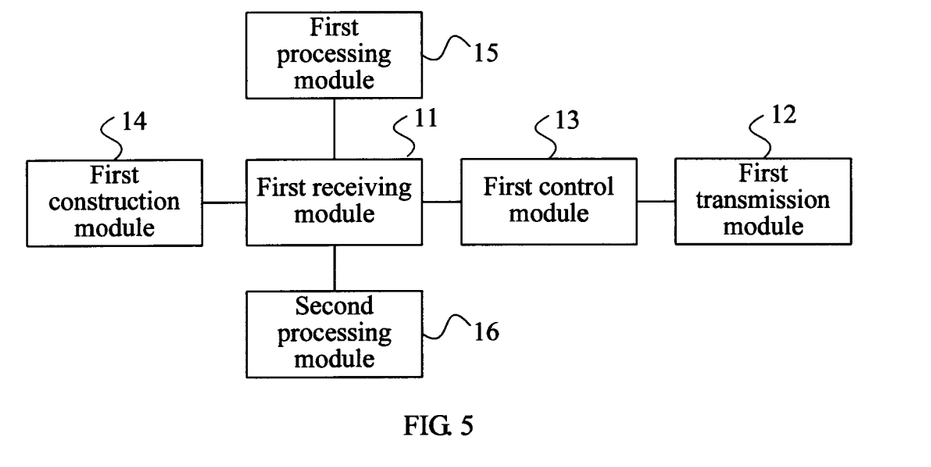
FIG. 5 is a schematic structure diagram of Embodiment 2 of an SNSF according to the present invention.

FIG. 5 is a schematic structure diagram of Embodiment 2 of an SNSF according to the present invention. As shown in FIG. 5, the SNSF includes the first receiving module 11, the first transmission module 12, and the first control module 13, and further includes a first construction module 14 configured to construct a Reset Acknowledge message and return the Reset Acknowledge message to the MSC. After the first receiving module 11 receives the reset message transmitted by the MSC, the SNSF constructs the Reset Acknowledge message through the first construction module 14 and returns the message to the MSC in replacement of the BSC, so as to inform the MSC that the corresponding BSC receives the reset message and is ready to release the connection resources.

The SNSF provided in this embodiment further includes a first processing module 15 configured to record a current first system time after receiving the reset message from the MSC, set an unavailability identifier indicating that the MSC is unable to receive the service message, and judge whether a time interval between the first system time and the current system time exceeds the first preset duration after receiving a connection establishment request message transmitted by the BSC, and if the time interval exceeds the first preset duration, clear the unavailability identifier.

The SNSF further includes a second processing module 16 configured to record a current second system time after detecting that failures occur in all the links with the MSC, set an unavailability identifier indicating that the MSC is unable to receive the service message, and clear the unavailability identifier according to the second system time and the current system time after receiving the reset message. The step of clearing the unavailability identifier specifically includes the following steps.

If a first time interval between the current system time and the second system time exceeds the resource release time required to complete the release of the connection resources between the BSC and the MSC, the unavailability identifier is cleared.

If the first time interval between the current system time and the second system time does not exceed the resource release time required to complete the release of the connection resources between the BSC and the MSC, the first preset duration is adjusted to a difference value between the resource release time and the first time interval, and the unavailability identifier is cleared after the first preset duration.

Through the SNSF provided in this embodiment, after the MSC is restarted, a certain protection time is started, and new service messages are not forwarded to the MSC in the protection time, so as to prevent the conflict of SCCP connection resources between new services and existing services.

This embodiment provides a network system, which includes an MSC, a BSC, and an SNSF between the MSC and the BSC, where the SNSF may use the SNSF provided in the embodiments as described in FIG. 4 or FIG. 5, and the structure and function thereof are referred to the foregoing embodiments, which are not described in detail herein again. Through the network system provided in this embodiment, it is avoided that the reset message is transmitted to all the BSCs by the MSC causing that all the service connections including the normal service connections are released accordingly, and it is also avoided that two records correspond to one connection reference number allocated by the MSC on the BSC, thereby improving the QoS of the services.

Figure 6:
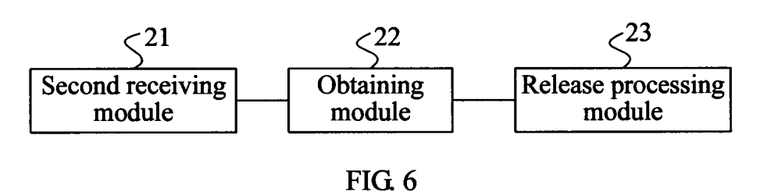
FIG. 6 is a schematic structure diagram of an embodiment of a BSC according to the present invention.

FIG. 6 is a schematic structure diagram of an embodiment of a BSC according to the present invention. As shown in FIG. 6, the BSC includes a second receiving module 21, an obtaining module 22, and a release processing module 23. The second receiving module 21 is configured to receive a reset message forwarded by an MSC through an SNSF, where the reset message carries NRI information of the MSC. The obtaining module 22 is configured to obtain a destination service connection corresponding to the NRI information carried in the reset message in the established service connection according to the NRI information included in a connection reference number allocated by the MSC and the NRI information carried in the reset message. The release processing module 23 is configured to release connection resources occupied by the destination service connection obtained by the obtaining module 22.

Specifically, after the MSC is restarted due to removal of a failure or an active operation of an operator, the MSC transmits the reset message to the SNSF to request the SNSF to forward the message to the BSC, so that the BSC releases a previously established SCCP connection, where the reset message carries the NRI information. The SNSF forwards the reset message to the BSC. After the second receiving module 21 in the BSC receives the reset message, the obtaining module 22 checks the established SCCP connection. If the NRI information in the connection reference number of an opposite end recorded in the SCCP connection is the same as the NRI information in the reset message, the release processing module 23 releases the corresponding SCCP connection resources; and if the NRI information in the connection reference number of an opposite end recorded in the SCCP connection is different from the NRI information in the reset message, the corresponding SCCP connection is not affected.

Through this embodiment, after the BSC receives the reset message where the NRI information is added and transmitted by the MSC, the SCCP connection requiring resource release is found according to the NRI information in the reset message, and the occupied resources are released. Therefore, it is ensured that the services of other MSCs are not affected and the connection corresponding to the originally failed MSC on the BSC can be released, so new services are not affected, thereby improving the QoS of the services.

Figure 7:
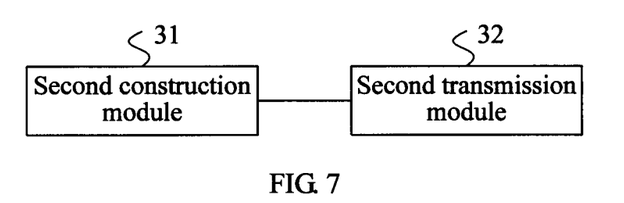
FIG. 7 is a schematic structure diagram of Embodiment 1 of an MSC device according to the present invention.

FIG. 7 is a schematic structure diagram of Embodiment 1 of an MSC device according to the present invention. As shown in FIG. 7, the MSC includes a second construction module 31 and a second transmission module 32. The second construction module 31 is configured to construct a reset message, where the reset message carries NRI information of the MSC. The second transmission module 32 is configured to transmit the reset message to a BSC through an SNSF, so as to instruct the BSC to release connection resources occupied by a service connection corresponding to the NRI.

Specifically, after the MSC is restarted due to removal of a failure or an active operation of an operator, the second construction module 31 constructs the reset message, and adds the NRI information in the reset message. After the second construction module 31 completes the construction of the reset message, the second transmission module 32 transmits the reset message to the SNSF to request the SNSF to forward the message to the BSC, so that the BSC releases previously established SCCP connection resources.

The MSC provided in this embodiment adds the NRI information in the reset message, so that the BSC finds the SCCP connection requiring resource release according to the NRI information, and releases the occupied resources. Therefore, it is ensured that the services of other MSCs are not affected and the connection corresponding to the MSC (for example, the failed MSC) that originally transmits the reset message on the BSC can be released, so new services are not affected, thereby improving the QoS of the services.

This embodiment further provides a network system, which includes an MSC, a BSC and an SNSF between the MSC and the BSC where. The BSC may use the BSC provided in the embodiment as described in FIG. 6, the MSC may use the MSC provided in the embodiment as described in FIG. 7, and the structure and function thereof may be referred to the foregoing embodiments, which are not described in detail herein again. Through the network system in this embodiment, it is ensured that the services of other MSCs are not affected and the connection corresponding to the originally failed MSC on the BSC can be released, so new services are not affected, thereby improving the QoS of the services.

Figure 8:
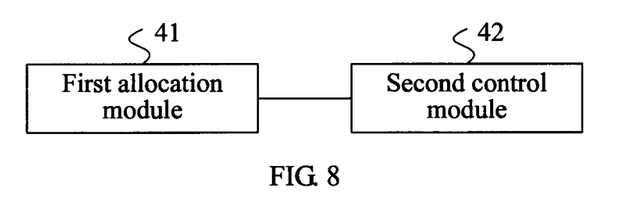
FIG. 8 is a schematic structure diagram of Embodiment 2 of an MSC device according to the present invention.

FIG. 8 is a schematic structure diagram of Embodiment 2 of an MSC device according to the present invention. As shown in FIG. 8, the MSC includes a first allocation module 41 and a second control module 42. The first allocation module 41 is configured to allocate a connection reference number configured to establish a service connection to a service message transmitted by a BSC through an SNSF. The second control module 42 is configured to, after the MSC is restarted, control the first allocation module 41 to allocate the connection reference number in other connection reference number groups different from an original connection reference number group, where the original connection reference number group is a connection reference number group configured to allocate the connection reference number to the MSC before a failure.

Specifically, the MSC divides all the allocatable connection reference number resources into a plurality of connection reference number groups, and after each restart due to removal of a failure or an active operation of an operator, the MSC controls the first allocation module 41 to switch the connection reference number group through the second control module 42, and selects an SCCP service connection in a new connection reference number group, so as to avoid that the allocated connection reference number overlaps the connection reference number allocated in the connection reference number groups before the failure. Further, the connection reference number groups may be divided according to the NRI information included in the connection reference number.

The MSC provided in this embodiment does not transmit the reset message to the BSC after restart, divides the SCCP connection reference number resources, and adopts different allocation policies according to actual requirements, so as to avoid the conflict between the newly allocated connection reference number resources and the connection reference number resources allocated before the failure. Therefore, it is ensured that the services of other MSCs are not affected and the connection corresponding to the originally failed MSC on the BSC can be released, so new services are not affected, thereby improving the QoS of the services.

This embodiment further provides a network system, which includes an MSC, a BSC, and an SNSF between the MSC and the BSCwhere. The MSC may use the MSC provided in the embodiment as described in FIG. 8, and the structure and function thereof may be referred to the foregoing embodiment, which is not described in detail herein again. Through the network system in this embodiment, it is ensured that the services of other MSCs are not affected and the connection corresponding to the originally failed MSC on the BSC can be released, so new services are not affected, thereby improving the QoS of the services.

Figure 9:
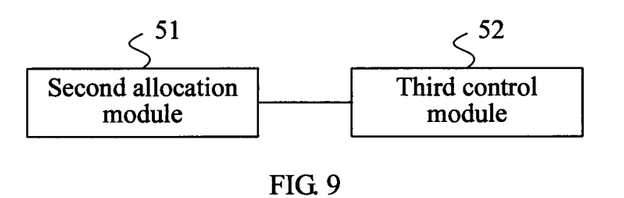
FIG. 9 is a schematic structure diagram of Embodiment 3 of an MSC device according to the present invention.

FIG. 9 is a schematic structure diagram of Embodiment 3 of an MSC device according to the present invention. As shown in FIG. 9, the MSC includes a second allocation module 51 and a third control module 52. The second allocation module 51 is configured to allocate a connection reference number configured to establish a service connection to a service message transmitted by the BSC through the SNSF. The third control module 52 is configured to, in a second preset duration after the MSC is restarted, control the second allocation module 51 to allocate, in a second connection reference number group, the connection reference number configured to establish the service connection to the service message transmitted by the BSC through the SNSF, and switch to a first connection reference number group after the second preset duration, and allocate the connection reference number configured to establish the service connection to the service message transmitted by the BSC through the SNSF, where release of connection resources between the BSC and the MSC is ensured to be completed in the second preset duration.

Specifically, the MSC divides all the allocatable connection reference number resources into a plurality of connection reference number groups, for example, a first connection reference number group and a second connection reference number group, in order to avoid that the second allocation module 51 repeatedly allocates the originally allocated connection reference number to other services during the process that the BSC releases the connection resources through an IT mechanism; therefore, the second allocation module 51 allocates the connection reference number to the service connection in two different connection reference number groups respectively in different periods. The second preset duration, that is, the switch time should be longer than or equal to T(iar), and in a duration not shorter than T(iar), the second allocation module 51 allocates the connection reference number in the second connection reference number group; while in a duration over T(iar), the second allocation module 51 allocates the connection reference number in the first connection reference number group. The third control module 52 in the MSC controls the second allocation module 51 to switch the connection reference number group. Definitely, the MSC may divide the connection reference number resources into a plurality of connection reference number groups, and further, the MSC may divide according to the NRI information included in the connection reference number.

The MSC provided in this embodiment does not transmit the reset message to the BSC after restart due to removal of a failure and an active operation of the operator, divides the SCCP connection reference number resources, and adopts different allocation policies according to actual requirements, so as to avoid the conflict between the newly allocated connection reference number resources and the connection reference number resources allocated before the failure. Therefore, it is ensured that the services of other MSCs are not affected and the connection corresponding to the originally failed MSC on the BSC can be released, so new services are not affected, thereby improving the QoS of the services.

This embodiment further provides a network system, which includes an MSC, a BSC, and an SNSF between the MSC and the BSCwhere. The MSC may use the MSC provided in the embodiment as described in FIG. 9, and the structure and function thereof may be referred to the foregoing embodiment, which are not described in detail herein again. Through the network system in this embodiment, it is ensured that the services of other MSCs are not affected and the connection corresponding to the originally failed MSC on the BSC can be released, so new services are not affected, thereby improving the QoS of the services.

Figure 10:
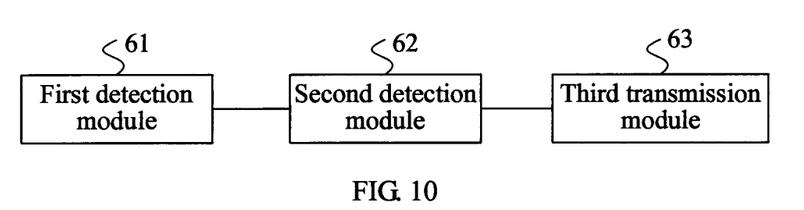
FIG. 10 is a schematic structure diagram of Embodiment 3 of an SNSF according to the present invention.

FIG. 10 is a schematic structure diagram of Embodiment 3 of an SNSF according to the present invention. As shown in FIG. 10, the SNSF includes a first detection module 61, a second detection module 62, and a third transmission module 63. The first detection module 61 in the SNSF records a current third system time after detecting that failures occur in all the links between the SNSF and a service processing entity, for example, an MSC, and sets an unavailability identifier indicating that the MSC is unable to receive a service message. The second detection module 62 is configured to judge whether a time interval between the third system time and the current system time exceeds a first preset duration after detecting the links between the SNSF and the MSC are restored. If the second detection module 62 judges that the time interval between the third system time and the current system time exceeds the first preset duration, the third transmission module 63 clears the unavailability identifier, that is, it indicates that the MSC is in a normal state, and restores the transmission of the service message to the MSC, where release of connection resources related to the MSC and established before the failure is ensured to be completed in the first preset duration.

If the second detection module 62 judges that the time interval between the third system time and the current system time does not exceed the first preset duration, the third transmission module 63 delays a period, so that the time interval between the delayed system time and the third system time exceeds the first preset duration, clears the unavailability identifier, and restores the transmission of the service message to the service processing entity.

The SNSF provided in this embodiment does not forward new service messages to the MSC in a protection time by judging whether a failure occurs in the link between the SNSF and the MSC or whether the failure is removed. The MSC is not required to transmit the reset message, and also not required to perform special processing of allocating the connection reference number, so as to avoid the conflict of the SCCP connection resources between new services and existing services.

This embodiment provides a network system, which includes an MSC, a BSC, and an SNSF between the MSC and the BSCwhere. The SNSF may use the SNSF provided in the embodiment as described in FIG. 10, and the structure and function thereof may be referred to the foregoing embodiment, which is not described in detail herein again. In the network system provided in this embodiment, the MSC is not required to transmit the reset message, and also not required to perform special processing of allocating the connection reference number, so as to avoid the conflict of the SCCP connection resources between new services and existing services, thereby improving the QoS of the services.

Finally, it should be noted that the above embodiments are merely provided for describing the technical solutions of the present invention, but not intended to limit the present invention. It should be understood by persons of ordinary skill in the art that although the present invention has been described in detail with reference to the embodiments, modifications can be made to the technical solutions described in the embodiments, or equivalent replacements can be made to some technical features in the technical solutions, as long as such modifications or replacements do not depart from the spirit and scope of the present invention.

What is claimed is:

1. A method for processing release of connection resources, comprising:
   stopping, by a Serving Node Selection Function (SNSF) within a node, transmission of a service message to a Mobile Switch Center (MSC) in a first preset duration after receiving a reset message;
   restoring, by the SNSF within the node, transmission of a service message to the MSC after the first preset duration; and
   after receiving the reset message transmitted by the MSC, constructing, by the SNSF within the node, a Reset Acknowledge message and returning the Reset Acknowledge message to the MSC,
   wherein the first preset duration is set to ensure release of connection resources between a Base Station Controller (BSC) and the MSC, and
   wherein a timer is disposed to ensure that all of the connection resources between the BSC and the MSC are released.

2. The method for processing release of connection resources according to claim 1, further comprising setting the first preset duration in a first protection timer and starting the first protection timer to control the transmission of the service message after receiving the reset message.

3. The method for processing release of connection resources according to claim 1, wherein the first preset duration is adjustable.

4. The method for processing release of connection resources according to claim 1, further comprising:
   recording, by the SNSF within the node, a current system time and a second system time after detecting that failures occur in all links with the MSC;
   setting, by the SNSF within the node, an unavailability identifier that indicates the MSC is unable to receive the service message; and
   clearing, by the SNSF within the node, the unavailability identifier according to the second system time and the current system time after receiving the reset message,
   wherein the clearing, by the SNSF within the node, the unavailability identifier comprises:
      clearing the unavailability identifier if a first time interval between the current system time and the second system time exceeds the resource release time required to complete the release of the connection resources between the BSC and the MSC;
      adjusting the first preset duration to a difference value between the resource release time and the first time interval; and
      clearing the unavailability identifier after the first preset duration if the first time interval between the current system time and the second system time does not exceed the resource release time required to complete the release of the connection resources between the BSC and the MSC.

5. The method for processing release of connection resources according to claim 1, further comprising transmitting a notification message notifying that the MSC transmits the reset message to other SNSF nodes connected to the MSC.

6. A Serving Node Selection Function (SNSF) device, comprising:
   a first receiving module configured to receive a reset message transmitted by a Mobile Switch Center (MSC) device;
   a first transmission module configured to transmit a service message to the MSC device;
   a first construction module configured to construct a Reset Acknowledge message and return the Reset Acknowledge message to the MSC device; and
   a first control module configured to:
      control the first transmission module to stop transmitting the service message to the MSC device in a first preset duration after the first receiving module receives the reset message; and
      control the first transmission module to restore the transmission of a service message to the MSC device after the first preset duration,
      wherein the first preset duration is set to ensure release of connection resources between a Base Station Controller (BSC) and the MSC device, and
      wherein a timer is disposed to ensure that all of the connection resources between the BSC and the MSC device are released.

7. The SNSF device according to claim 6, further comprising:
   a second processing module configured to:
      record the current system time and a second system time after detecting that failures occur in all links with the MSC;
      set an unavailability identifier that indicates the MSC is unable to receive the service message; and
      clear the unavailability identifier according to the second system time and the current system time after receiving the reset message,
   wherein the clearing the unavailability identifier comprises:
      clearing the unavailability identifier if a first time interval between the current system time and the second system time exceeds the resource release time required to complete the release of the connection resources between the BSC and the MSC;
      adjusting the first preset duration to a difference value between the resource release time and the first time interval; and
      clearing the unavailability identifier after the first preset duration if the first time interval between the current system time and the second system time does not exceed the resource release time required to complete the release of the connection resources between the BSC and the MSC.

8. The method for processing release of connection resources according to claim 1, further comprising receiving, by the SNSF within the node, the service message from the BSC.

9. The method for processing release of connection resources according to claim 1, wherein the SNSF node does not transmit the reset message to the BSC.

10. The method for processing release of connection resources according to claim 1, wherein the first preset duration represents a duration of time that no service messages are sent to the MSC after receiving the reset message, and wherein the first preset duration starts after receiving the reset message.

11. The SNSF device according to claim 6, wherein the first receiving module is further configured to receive the service message from the BSC.

12. The SNSF device according to claim 6, wherein the first preset duration represents a duration of time that no service messages are sent to the MSC after receiving the reset message, and wherein the first preset duration starts after receiving the reset message.

13. A method for processing release of connection resources, comprising:
   stopping, by a Serving Node Selection Function (SNSF) within a node, transmission of a service message to a Mobile Switch Center (MSC) in a first preset duration after receiving a reset message;
   restoring, by the SNSF within the node, transmission of a service message to the MSC after the first preset duration; and
   after receiving the reset message transmitted by the MSC, constructing, by the SNSF within the node, a Reset Acknowledge message and returning the Reset Acknowledge message to the MSC,
   wherein the first preset duration is set to ensure release of connection resources between a Base Station Controller (BSC) and the MSC,
   wherein the first preset duration is set to ensure release of connection resources between a BSC and the MSC by determining a time interval between a first system and a current system time that exceeds the first preset duration, and
   wherein the first system time is recorded by the SNSF after receiving the reset message transmitted by the MSC.

14. A Serving Node Selection Function (SNSF) device, comprising:
   a first receiving module configured to receive a reset message transmitted by a Mobile Switch Center (MSC) device;
   a first transmission module configured to transmit a service message to the MSC device;
   a first construction module configured to construct a Reset Acknowledge message and return the Reset Acknowledge message to the MSC device; and
   a first control module configured to:
      control the first transmission module to stop transmitting the service message to the MSC device in a first preset duration after the first receiving module receives the reset message; and
      control the first transmission module to restore the transmission of a service message to the MSC device after the first preset duration,
   wherein the first preset duration is set to ensure release of connection resources between a Base Station Controller (BSC) and the MSC by determining a time interval between a first system and a current system time that exceeds the first preset duration, and
   wherein the first system time is recorded by the SNSF after receiving the reset message transmitted by the MSC.

15. The method for processing release of connection resources according to claim 13, further comprising:
   recording setting an unavailability identifier indicating that the MSC is unable to receive the service message;
   after receiving a connection establishment request message transmitted by the BSC, judging, by the SNSF within the node, that the unavailability identifier is set for the MSC;
   judging, by the SNSF within the node, whether the time interval between the first system time and the current system time exceeds the first preset duration; and
   clearing, by the SNSF within the node, the unavailability identifier if the time interval exceeds the first preset duration.

16. The SNSF device according to claim 14, further comprising:
   a first processing module configured to:
      set an unavailability identifier that indicates the MSC is unable to receive the service message;
      after receiving a connection establishment request message transmitted by the BSC, judge that the unavailability identifier is set for the MSC;
      judge whether the time interval between the first system time and the current system time exceeds the first preset duration; and
      clear the unavailability identifier if the time interval exceeds the first preset duration.

* * * * *

UNITED STATES PATENT AND TRADEMARK OFFICE
CERTIFICATE OF CORRECTION

| | | |
|---|---|---|
| PATENT NO. | : 8,737,970 B2 | Page 1 of 1 |
| APPLICATION NO. | : 13/365945 | |
| DATED | : May 27, 2014 | |
| INVENTOR(S) | : Yunfei Li et al. | |

It is certified that error appears in the above-identified patent and that said Letters Patent is hereby corrected as shown below:

In the Claims

Column 24, lines 18-31, Claim 15 should read

The method for processing release of connection resources according to claim 13, further comprising:
setting an unavailability identifier indicating that the MSC is unable to receive the second service message; after receiving a connection establishment request message transmitted by the BSC, judging, by the SNSF within the node, that the unavailability identifier is set for the MSC;
judging, by the SNSF within the node, whether the time interval between the first system time and the current system time exceeds the first preset duration; and
clearing, by the SNSF within the node, the unavailability identifier if the time interval exceeds the first preset duration.

Signed and Sealed this
Thirteenth Day of January, 2015

Michelle K. Lee
*Deputy Director of the United States Patent and Trademark Office*